June 21, 1960     M. E. GLUHAREFF     2,941,752
AIRCRAFT WITH RETRACTABLE AUXILIARY AIRFOIL
Filed Dec. 31, 1953     4 Sheets-Sheet 1

INVENTOR
MICHAEL E. GLUHAREFF
BY *M. B. Tasker*
ATTORNEY

June 21, 1960   M. E. GLUHAREFF   2,941,752
AIRCRAFT WITH RETRACTABLE AUXILIARY AIRFOIL
Filed Dec. 31, 1953   4 Sheets-Sheet 2

INVENTOR
MICHAEL E. GLUHAREFF
BY M. B. Tasker
ATTORNEY

June 21, 1960      M. E. GLUHAREFF      2,941,752
AIRCRAFT WITH RETRACTABLE AUXILIARY AIRFOIL
Filed Dec. 31, 1953      4 Sheets-Sheet 3
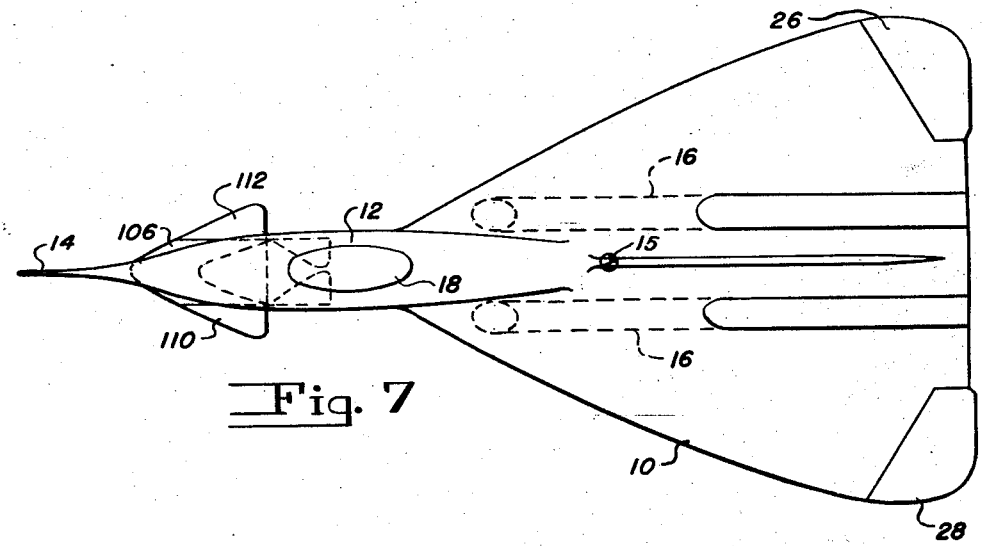
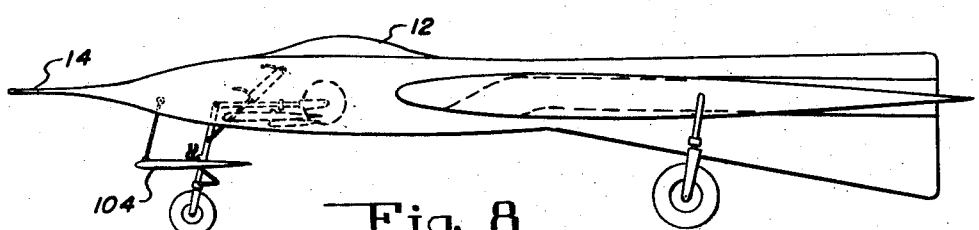
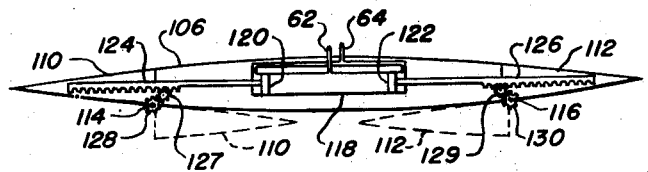
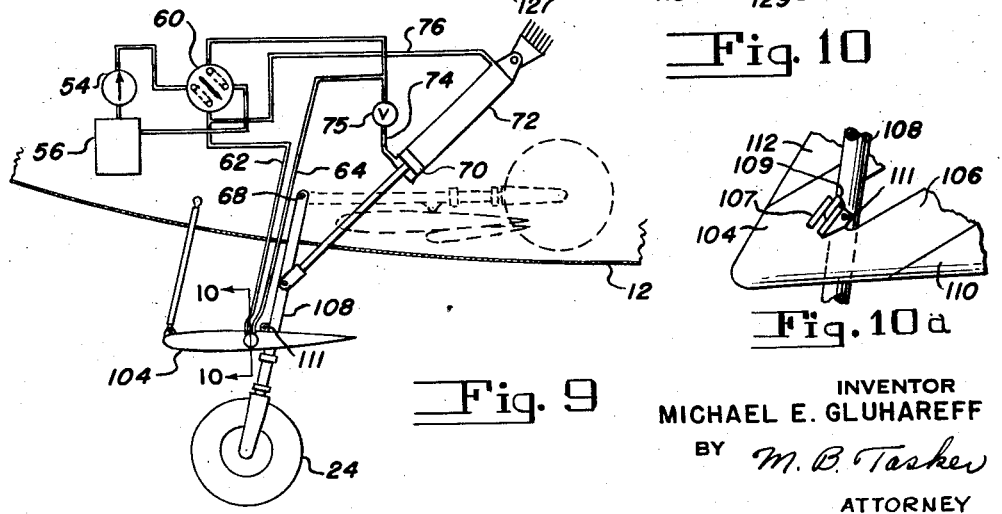
INVENTOR
MICHAEL E. GLUHAREFF
BY M. B. Tasker
ATTORNEY

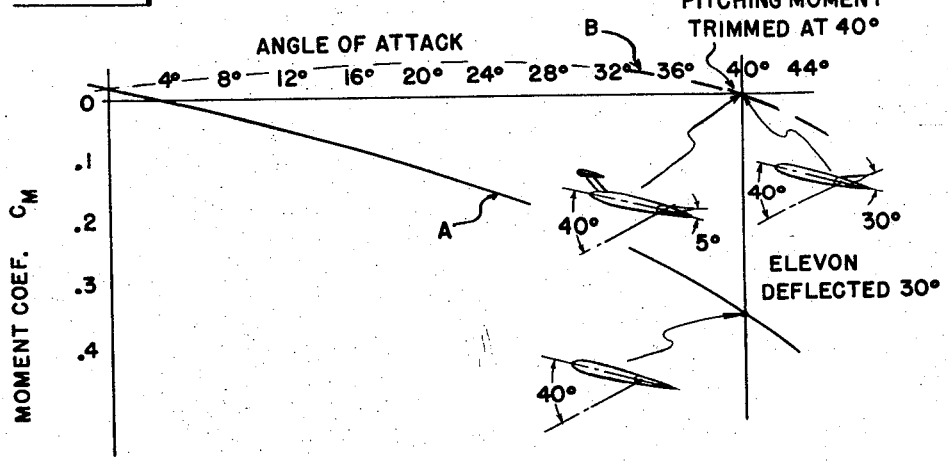
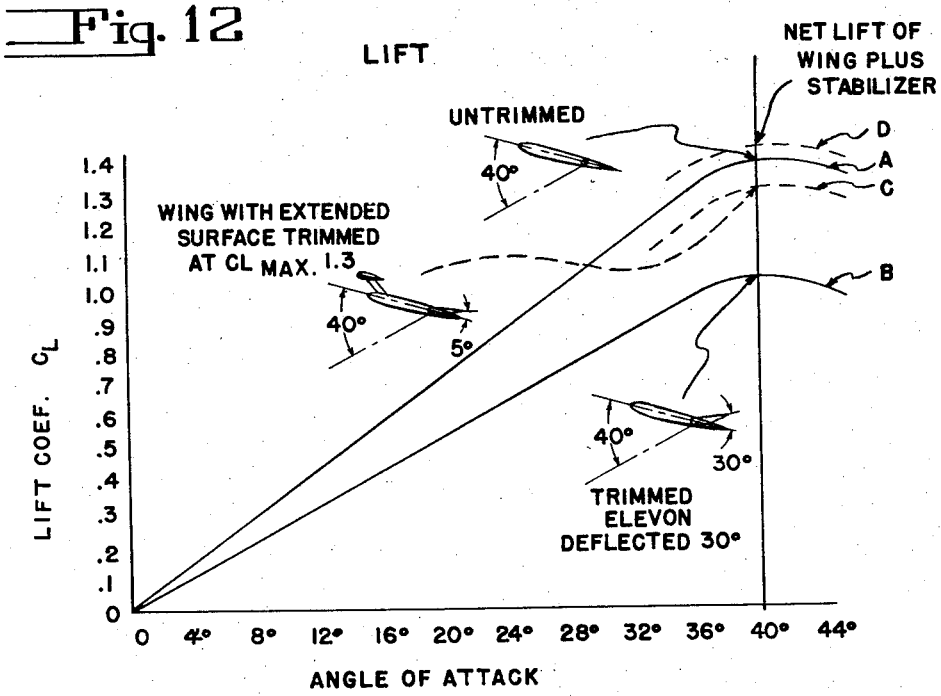

United States Patent Office 2,941,752
Patented June 21, 1960

2,941,752

AIRCRAFT WITH RETRACTABLE AUXILIARY AIRFOIL

Michael E. Gluhareff, Fairfield, Conn., assignor to United Aircraft Corporation, East Hartford, Conn., a corporation of Delaware Filed Dec. 31, 1953, Ser. No. 401,524

10 Claims. (Cl. 244—46)

This invention relates to airplanes having triangular plan form wings, particularly flying wing airplanes of the type shown in my Patent No. 2,511,502, issued June 13, 1950, employing a dart-shaped wing of low aspect ratio in the order of, for example, 1.3.

Such dart-shaped, low aspect ratio wings have unusually high values of maximum lift coefficient as compared to sweptback wings and low aspect ratio trapezoidal wings. It is possible on a model of such a wing to achieve an untrimmed maximum lift coefficient of 1.4. Thus the full scale $C_L$ maximum would be somewhat higher.

In the case of an airplane employing a dart-type wing the maximum lift is appreciably reduced when elevon type control surfaces are deflected upward to produce trim at the maximum lift coefficient. This loss in net lift as a result of trimming is particularly large because of the increase in negative slope of the pitching moment variation with lift coefficient or angle of attack which is characteristic of this wing. The reduction in trim lift results from the fact that the elevon is necessarily located on the trailing edge of the wing, which results in a small moment arm in comparison to an airplane having a tail surface spaced some distance aft of the wing.

It is an object of this invention to provide a trim surface in such an airplane whose moment arm may be somewhat greater than the elevon but more specifically to provide a tail forward arrangement for a delta wing airplane for achieving trim resulting in an increase rather than decrease of net lift.

At high speeds and low angles of attack such a forward tail location, however, is destabilizing in this type of airplane and it is a further object of this invention to provide such a trim surface located forward of the center of gravity which is effective only at flight attitudes in which excessive stability is available and of such size and so located relative to the center of gravity of the wing as to permit attainment of the required amount of stability at high values of lift coefficient.

A further object of the invention is to provide a generally triangular plan form for the forward tail surface of such an airplane which will have the characteristic of a low lift slope and high angle of attack for stalling and a well rounded or flat lift curve at the tail maximum lift.

A further object of the invention is to provide such a forward tail having an incidence which will result in a tail lift as near the maximum value as is compatible with satisfactory pitching characteristics resulting from stall when the airplane is trimmed near maximum lift.

A still further object of the invention is to provide forward tail surfaces for such an airplane which are retractable in flight.

A yet further object of the invention is to provide means for retracting and extending such surfaces as the landing gear is retracted and extended.

A further object of the invention is generally to improve the construction and performance of dart-shaped all wing airplanes.

These and other objects and advantages of the invention will be evident or will be pointed out in the following detailed description of three embodiments of the invention shown in the accompanying drawings.

In these drawings:

Fig. 7 is a plan view showing still another form of forward tail;

Fig. 8 is a side view of Fig. 7;

Fig. 9 is an enlarged view showing diagrammatically the mechanism for actuating the forward tail surfaces and the forward landing gear;

Fig. 10 is a sectional view taken on line 10—10 of Fig. 9;

Fig. 10a is a detailed view showing the pivotal mounting for the forward tail surface;

Fig. 11 is a graph illustrating the pitching moment coefficient as it varies with angle of attack for a low aspect ratio delta wing plan form under different conditions of trim; and Fig. 12 is a graph illustrating the lift coefficient vs. angle of attack for various trimmed and untrimmed conditions.

Figure 2:
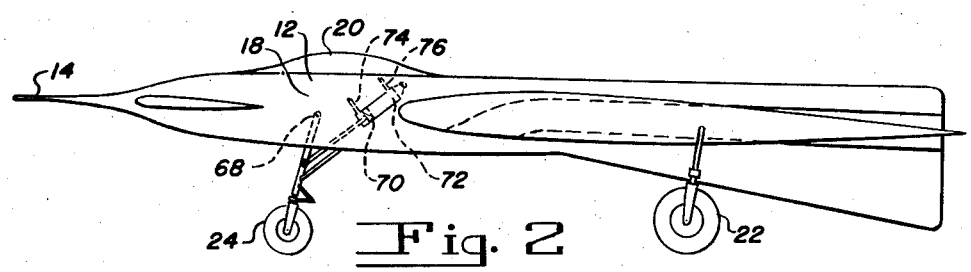
Fig. 2 is a side elevation of the airplane of Fig. 1.

The airplane embodying the invention is of the type generally referred to as a flying wing and comprises a dart-shaped wing 10 of low aspect ratio, preferably in the range of 1.2 to 1.35, as described in my Patent No. 2,511,502, referred to above, from which a fuselage 12 protrudes forwardly and terminates in a pointed nose 14. As shown in Fig. 2, wing 10 is of a generally symmetrical airfoil shape and houses a pair of gas turbine engines 16. The pilot compartment 18 is located in the fuselage forward of the wing and is provided with a bubble or canopy 20 which projects slightly above the fuselage. The landing gear is of the tricycle type including a pair of main landing gears 22 which are retractable in flight into the wing and nose gear 24 which is retractable into the fuselage. Horizontal control surfaces 26 and 28 are provided at the trailing edge of the wing in the outer half span thereof for controlling the airplane in flight. These are combined elevator and aileron surfaces commonly termed elevons and capable of being moved in unison to act as elevators and differentially to act as ailerons, the controls being such that these functions may be exercised either separately or simultaneously by appropriate movement of the pilot's control stick. The airplane shown herein is illustrated and described in detail and is claimed in my above-mentioned Patent No. 2,511,502, and reference is made to this patent for a more detailed description of the airplane.

In accordance with the present invention, trim surfaces are provided forward of the C.G. of the airplane for trimming the ship in the high angle nose-up attitude assumed by an airplane of this type during landing approach so that the maximum lift coefficient of the wing will not be reduced as much during landing as would be the case if the ship were trimmed by upward deflection of the two elevon surfaces 26 and 28, a situation which will be explained in detail in connection with Figs. 11 and 12.

Figure 1:
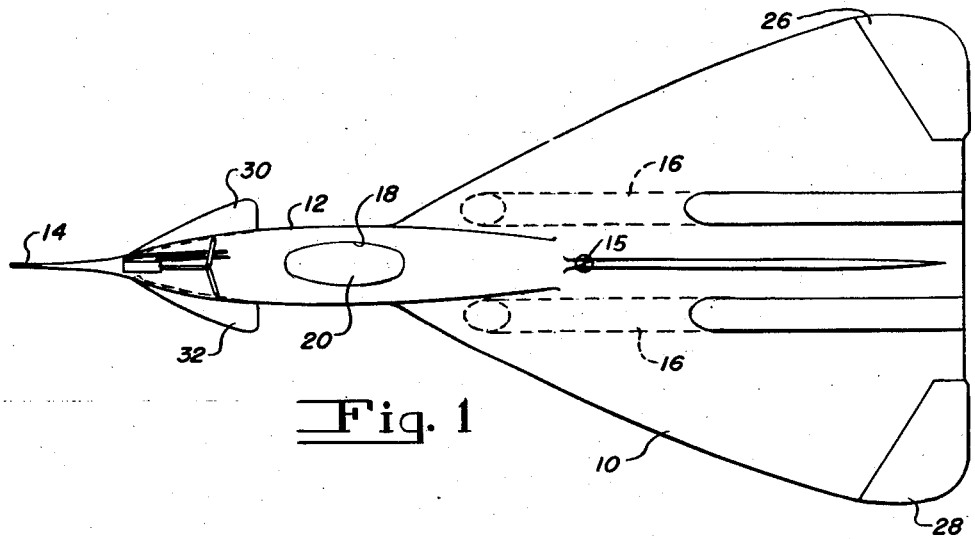
Fig. 1 is a plan view of an all wing dart-shaped airplane of low aspect ratio embodying the invention.
Figure 3:
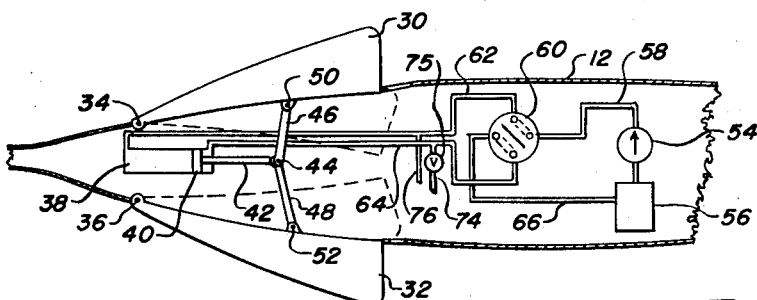
Fig. 3 is an enlarged view of the forward portion of Fig. 1 showing diagrammatically the hydraulic mechanism for the forward tail surfaces and the forward landing gear.

As shown in Figs. 1 to 3, the forwardly located trim surfaces 30 and 32 are provided on opposite sides of the fuselage at the nose thereof at the maximum practicable distance from the C.G. of the airplane with their trailing edges forward of the center of pressure 15 of the wing. Since in the high speed or low angle of attack condition the presence of such trim surfaces is extremely destabilizing as well as increasing the drag of the whole aircraft, means are provided to retract these surfaces during normal flight so that their use is limited only to flight attitudes in which large longitudinal nose-down moments occur, such as during landing approaches at high angles of attack. To this end the surfaces 30 and 32 are hinged at their forward ends on vertical hinge pins 34 and 36, respectively in the fuselage and hydraulic means is provided for retracting these surfaces into the fuselage through slots in the opposite sides of the fuselage and for extending these surfaces. As shown most clearly in Fig. 3, a hydraulic cylinder 38 is provided in the fuselage in which a piston 40 reciprocates. A piston rod 42 is pivotally connected at 44 to the common pivot point of a pair of toggle links 46 and 48, the outboard extremities of which are pivoted at 50 and 52 to surfaces 30 and 32, respectively, at points well aft of the hinge pins 34 and 36 for these surfaces. It will be evident that as piston 40 moves to the right into the position shown in Fig. 3, the toggle comprising links 46 and 48 will be straightened and the surfaces 30 and 32 will be extended into the full line positions shown in Fig. 3, whereas movement of the piston to the left in Fig. 3 will result in the retraction of these surfaces into the shrouded dotted line position within the fuselage shown in this figure. When extended the members 30 and 32 cooperate with the fuselage to form a dart-shaped, low aspect ratio surface having the same advantageous aerodynamic characteristics as the wing 10 at high angles of attack.

Hydraulic means are provided for operating the piston 40. As shown in Fig. 3, a fluid pump 54 supplies fluid under pressure from a reservoir to a conduit 58. The fluid in conduit 58 is controlled by valve 60 which in the position shown in Fig. 3 directs the pressure fluid to a conduit 62 leading to cylinder 38 on the left-hand side of piston 40. Cylinder 38 on the opposite side of piston 40 is vented through a conduit 64 which communicates through valve 60 with a conduit 66 leading to the reservoir 56.

Figure 3A:
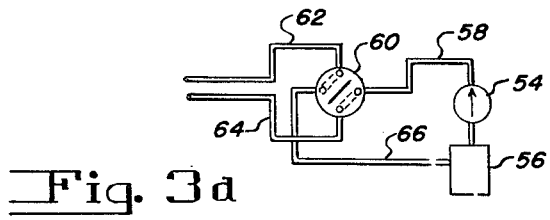
Fig. 3a is a detail view showing the hydraulic control valve in a different position.

It will be evident that the valve 60 is a two-way valve which in the position shown in Fig. 3 supplies pressure fluid to the left-hand side of piston 40, and in its alternative position shown in Fig. 3a, supplies fluid under pressure to the right-hand side of piston 40.

Since it is desired to extend the surfaces 30, 32 only during the nose-up attitude of the airplane during landing approaches when a large longitudinal pitching moment gradient is available, the hydraulic operating mechanism above described is, in accordance with this Figs. 1–3 form of the invention, tied in with the hydraulic mechanism for the nose landing gear 24. As shown in Fig. 2, the landing gear 24 is pivoted about a horizontal pivot 68 in the fuselage and is swung about this pivot by hydraulic piston 70 operating in a cylinder 72. Fluid conduits 74 and 76 are provided which communicate with the cylinder 72 on opposite sides of the piston and these conduits are connected with conduits 64 and 62, respectively, through which pressure fluid is alternatively supplied by two-way valve 60. Thus when hydraulic fluid is supplied under pressure to conduit 76 by valve 60 to extend the nose gear 24, surfaces 30 and 32 will be simultaneously extended, or when pressure fluid is supplied to conduit 74 by this valve to retract gear 24, the surfaces 30 and 32 will be simultaneously retracted.

Figure 4:
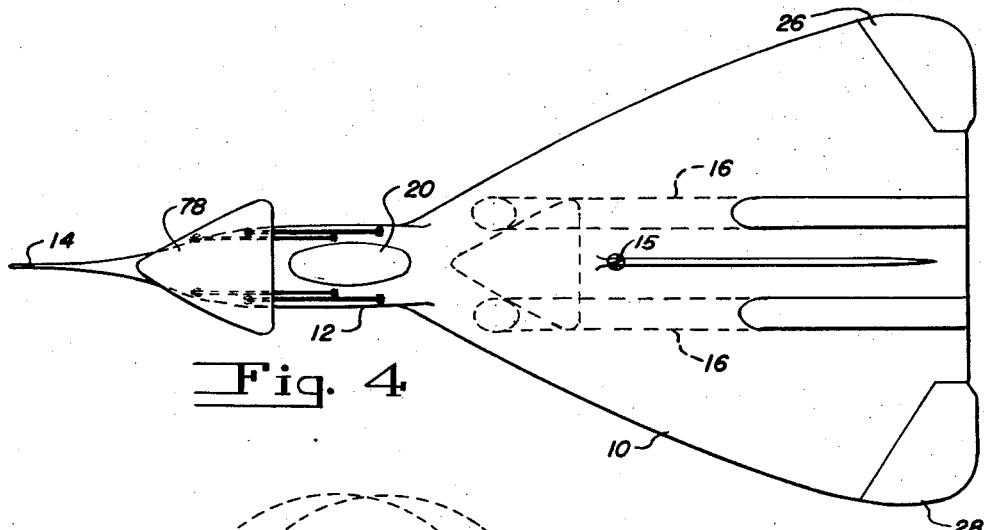
Fig. 4 is a plan view of the airplane of Fig. 1 equipped with a modified form of forward tail surface.
Figure 5:
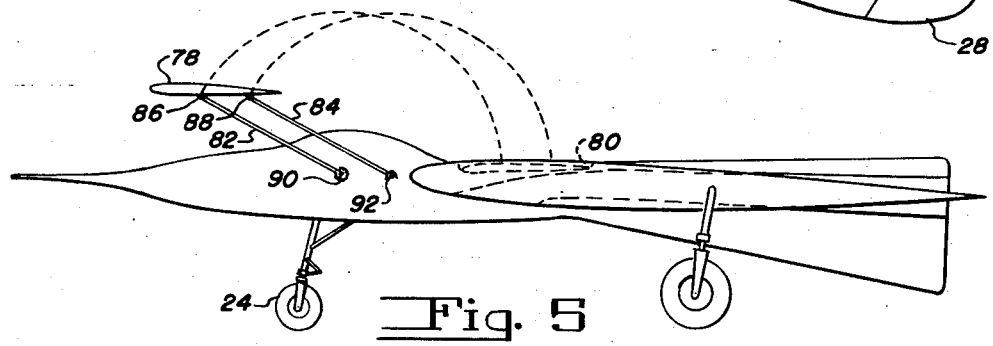
Fig. 5 is a side view of the airplane of Fig. 4.
Figure 6:
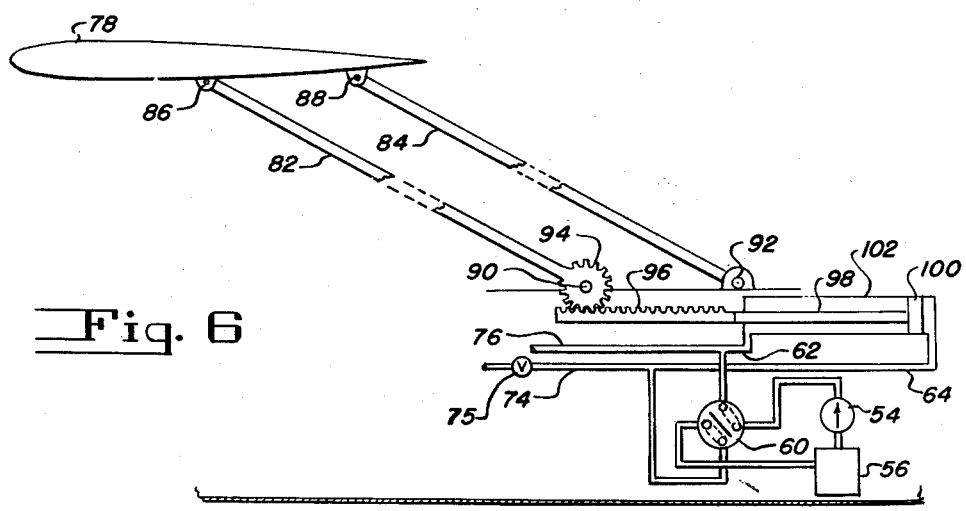
Fig. 6 is a diagrammatic view showing the hydraulic operating mechanism.

In Figs. 4 to 6, a modified construction is shown in which a single dart-shaped surface 78 is provided which is normally shrouded in a cavity 80 in the upper surface of the main wing 10 just aft of the pilot's compartment. The trim surface 78 is supported by two parallel linkage mechanisms, one disposed on either side of the fuselage as shown most clearly in Fig. 4. Each of these linkage mechanisms includes a forward link 82 and an aft link 84 which are pivoted at spaced points 86 and 88 on the bottom of the trim surface. The inboard ends of links 82 and 84 are pivoted to the fuselage at 90 and 92, respectively. The link 82 carries a pinion 94 which is rigidly connected to the inboard end thereof and meshes with a horizontally reciprocable rack 96 which forms an extension of a piston rod 98 carrying a piston 100. Piston 100 is reciprocable in a cylinder 102, the opposite ends of which are in communication with conduits 62 and 64, connected to a hydraulic system identical with that described in connection with Figs. 3 and 3a. The hydraulic actuating mechanism for nose landing gear 24 is identical with that shown in Fig. 2 and conduits 74 and 76 may be connected therewith for conjoint operation of the landing gear and trim surface as described in connection with Figs. 1 to 3. This surface, in its extended position, is also located so that its trailing edge is forward of the center of pressure 15 of the main wing.

In Figs. 7 to 10 a still further form of the invention is shown in which a trim surface 104 is provided which is of the same general shape as surface 78. Here however surface 104 is supported on the nose landing gear 24 and is extendable and retractable therewith relative to the fuselage 12. In order that the surface 104 may be fully retractable within the fuselage with the landing gear, this surface is made in three parts. A central part 106 (Figs. 10 and 10a) is pivotally mounted on the landing gear oleo strut 108 on hinge pin 111 which extends through a lug 109 carried by strut 108 and spaced lugs 107 carried by surface 104, and left and right extensions 110 and 112 are provided which are hinged to the central portion 106 and movable about hinges 114 and 116, respectively, during the retraction of the gear 24. The hydraulic system for controlling the extension and retraction of the landing gear is similar to that described in connection with Figures 1 to 3. In this form of the invention the outer panels 110 and 112 of the trim surfaces are folded downwardly and inwardly 180° from the position shown in Fig. 10 just prior to the completion of the retracting movement of the landing gear 24. The actuating mechanism for these outboard panels is shown most clearly in Fig. 10 and consists of a hydraulic cylinder 118 housed in the portion 106 of the surface in which two pistons 120 and 122 are reciprocable. Each piston carries a piston rod, the extended ends of which carry racks 124 and 126, respectively, which mesh with idler gears 127 and 129 mounted on 106, which in turn mesh with pinions 128 and 130 rigidly carried by the outboard panels 110 and 112, respectively. Thus as pressure fluid is directed into cylinder 72 to extend the landing gear, fluid is also supplied to cylinder 118 between the pistons 120 and 122 to move the panels 110 and 112 about their pivots 114 and 116 from the dotted line position shown in Fig. 10 toward their extended full line positions. Here it should be noted that during the first 90° of movement of the outboard panels 110 and 112 the landing gear will have moved out of the fuselage 12 so that the subsequent extension of these outboard panels takes place entirely outside the fuselage. Similarly during the retraction of the landing gear, the outboard panels 110 and 112 of the trim surface are moved into approximately vertical positions in which they can enter the landing gear well in the fuselage while the landing gear is still sufficiently extended to permit this folding movement of the panels. Should it be desired not to use this trimming surface during take-off, it would of course be possible to fold the outer panels while the nose-gear remains extended. This would decrease the aspect ratio of the fixed surface and spoil the flow over it to such an extent as to render it substantially ineffective. When the nose gear is down the trailing edge of surface 104, as in the Fig. 1 form, is located forward of the center of pressure 15 of the wing. Of course, an obvious modification of the hydraulic system shown would have to be made to separate the two circuits. Such a circuit modification would also hold for the previous two versions described, in the event it was found undesirable to use the trimming device, for example, during a catapult or jet-assist take-off. In this instance, the hydraulic line 74 (Figs. 3, 6 and 9) would be connected thru a pilot-controlled selector valve 75 so as to prevent pressure from reaching the landing gear retracting mechanism when the valve is shut off. The pilot can then retract the trim device in the Fig. 3 and Fig. 6 forms and fold the extensions 110 and 112 in the Fig. 9 form independently of the gear.

Figs. 11 and 12 show the results obtained by tests on models in a wind tunnel. They do not necessarily represent the values which might be obtained in flight of a full scale airplane. For example, on a full scale airplane $C_L$ maximum could well be as high as 1.9. However, the values shown are representative and are valid for purposes of comparison.

Curve A, Fig. 11, is a graph showing how the pitching moment coefficient varies with angle of attack of a low aspect ratio delta wing plan form. The moment of the wing is zero at a small positive angle of attack, about 3°, and becomes negative, that is, nose down, with increases in the angle of attack. It is significant in that curve A is non-linear for a plan form such as shown as against a high-aspect ratio wing. At a 40° angle of attack (maximum lift coefficient for the model) the pitching moment coefficient becomes —0.34. This is the curve for the basic wing untrimmed. By untrimmed is meant that the moment shown is the theoretical one such as might be measured on wind tunnel scales. In free flight it would represent a moment about the center of gravity in a nose-down direction and which would need to be balanced by some external means for an aircraft to maintain this attitude or angle of attack.

Curve B, in dash lines, is in effect curve A rotated about its zero moment point until it passes through the 40° angle of attack for a zero moment coefficient. This curve represents the model wing trimmed at this angle. The trim may be accomplished in two ways as shown by the pictorial sketches in Fig. 11. The right-hand sketch shows a 30° deflection of elevons 26, 28 by which the model may be trimmed for zero moment at a 40° angle of atack. This value is not absolute but is taken from experimental data. The left-hand sketch shows the model trimmed by the use of the extended auxiliary airfoil of this invention located ahead of the leading edge of the wing together with a 5° elevon deflection. In free flight this would mean that the models of both sketches would maintain either level flight or would climb or descend, depending upon the thrust power applied for propulsion. There would be no force tending to move the nose upward or downward and the aircraft, in either case, would remain in that attitude as long as the controls were not otherwise deflected.

Referring now to Fig. 12, curve A of this figure shows the lift coefficient of the untrimmed model which has a maximum at 40° where the lift coefficient is approximately 1.45. This is the case for the untrimmed model, that is, the control is not deflected and the full amount of lift available is being generated. However, this is a hypothetical condition where, in free flight, the pitching moment as shown in curve A of Fig. 11 would exist. Its value would be approximately minus 0.34 and in free flight the aircraft would have a large force tending to rotate the nose downward.

In curve B of Fig. 12 lift coefficient vs. angle of attack is shown for the trim model in which a 30° elevon deflection is used to obtain trim at a 40° angle of attack. Of course the elevon deflection would be different for each angle of attack chosen.

It will be clear that the maximum lift coefficient of curve B of Fig. 12 reaches a value of only 1.0. This is approximately a 30% loss of lift which results from the upward deflection of the elevons necessary to maintain trim. To avoid this, the present invention, by extending the forward airfoil surface, enables trimming at a much higher maximum lift coefficient. Thus at a 40° angle of attack, only a 5° upward elevon deflection is indicated and a consequent loss of lift coefficient of about .1 on the main wing or a loss of approximately 7% of the maximum lift coefficient. It should be noted that because the low aspect ratio delta shown here has a peculiar characteristic of a gradual flat-peak lift curve in the region of maximum lift, as compared to the sharp break in the lift curve of a high aspect ratio wing, it is possible to trim within the 40° angle of attack range as illustrated here. However, trimming at 80–90% of this value could be accomplished in a like manner by reducing the angle of incidence setting on the tail forward airfoil so that the aircraft would trim at a somewhat lower angle of attack.

The forwardly located auxiliary surface is further decidedly advantageous in producing a desired increase in net lift of the combined wing and trim surface, as the airload on the trim surface is positive rather than negative and thus the net $C_L$ maximum of the combination may be higher than the $C_L$ maximum of the wing alone such as shown in curve D, Fig. 12. With such a fixed trim surface, however, the elevons are used for obtaining longitudinal control. This will be evident when it is considered that the forwardly located trim surface is required to operate at high positive angles of attack in order to trim out the large wing diving moment. In the event of stall of the auxiliary surface, an extremely stable condition would result since the loss of upward load on the surface would produce nose-down pitching which would increase the airspeed over the main wing and prevent its stall. By reason of the retraction of the forward trim surface during normal flight, it is possible to use the elevons for longitudinal control and extend the forward surface into operative position only during landing when its operation is advantageous. It has been found that the tail-forward combination has negative stability at low angles of attack or in the high speed condition, and therefore, a non-retractable surface such as proposed in the prior art has not proved to be satisfactory.

It should also be noted that some margin of lift of the auxiliary surface beyond trim is desirable and to provide this the plan form of the surface should be selected to have a low lift slope and high angle of attack for stalling with a well rounded or flat lift curve at maximum lift of the auxiliary surface. Also the incidence of the auxiliary surface should be such as to result in a lift as near the maximum value as is compatible with satisfactory pitching characteristics resulting from stall when the aircraft is trimmed at maximum lift.

From the above it will be evident that as a result of this invention it has been made possible to trim a dart-shaped all wing airplane in the high angle nose-up attitude characteristic of such a ship during landing approach without materially reducing the maximum lift coefficient below the untrimmed value obtained under that condition.

Three forms of the invention have been shown and described but it will be understood that these are by way of example only and that various other forms may be resorted to without exceeding the scope of the invention.

I claim:

1. An aircraft comprising a main body having a flight sustaining means including a single flight sustaining aerodynamic surface, said aerodynamic surface having a dart shape with its apex positioned forwardly, said body also having a fuselage extending forwardly of said apex, an auxiliary means including a second aerodynamic surface having a dart shape with its apex positioned forwardly, said second aerodynamic surface being movable between a first flight position forward of said flight sustaining surface where it reacts with the free air stream surrounding said aircraft and a second retracted position within said body where it has no substantial effect on said aircraft, said second aerodynamic surface having a fixed angle of incidence with said fuselage in its first flight position, and means for moving said second auxiliary surface between said first flight positon and said second retracted position.

2. An aircraft having a flight sustaining means including a single flight sustaining aerodynamic surface, said aerodynamic surface having a dart shape with its apex positioned forwardly, a fuselage extending forwardly of said apex, an auxiliary lift producing means including a second aerodynamic surface formed of two sections located forwardly of said single flight sustaining surface, said second aerodynamic surface having a dart shape with its apex positioned forwardly, one section being mounted for movement on each side of said fuselage, said two sections being movable between a first flight position where the second aerodynamic surface reacts with the free air stream surrounding said aircraft and a second retracted position within said fuselage where said second aerodynamic surface has no substantial effect on said aircraft, said second aerodynamic surface having a fixed angle of incidence with said fuselage in its first flight position, and means for moving said sections between said first flight position and said second retracted position.

3. An aircraft having a flight sustaining means including a single flight sustaining aerodynamic surface, said aerodynamic surface having a dart shape with its apex positioned forwardly, a fuselage extending forwardly of said apex, an auxiliary lift producing means including a second aerodynamic surface formed of two sections located forwardly of said single flight sustaining surface, said second aerodynamic surface having a dart shape with its apex positioned forwardly, one section being mounted for movement on each side of said fuselage, said two sections being movable between a first flight position where each section of the second aerodynamic surface projects from its side of said aircraft and a second retracted position within said fuselage where both sections of said second aerodynamic surface are positioned within said aircraft, said second aerodynamic surface having a fixed angle of incidence with said fuselage in its first flight position, and means for moving said sections between said first flight position and said second retracted position.

4. An aircraft as defined in claim 1, wherein said second aerodynamic surface is a triangular plan form auxiliary airfoil having aerodynamic characteristics somewhat similar to those of the single flight sustaining aerodynamic surface pivotally connected to said fuselage and movable from an aft position in which it is shrouded in the upper surface of said single flight sustaining aerodynamic surface into a forward position in which it overlies the fuselage and projects laterally therefrom, and pilot operative means for actuating said auxiliary surface between said positions.

5. An aircraft as defined in claim 1 including fluid pressure operated actuating means for moving said second aerodynamic surface into an extended lift producing position, landing gear on said aircraft having a ground engaging member movable from a shrouded position into an extended ground engageable position, fluid pressure operated actuating means for moving said member into extended position, a source of pressure fluid in said aircraft, and mechanism operable by the pilot prior to landing for connecting both of said actuating means to said pressure source.

6. An aircraft as defined in claim 1, wherein said second aerodynamic surface is a triangular plan form auxiliary airfoil having aerodynamic characteristics somewhat similar to those of the single flight sustaining aerodynamic surface pivotally connected to said fuselage and movable from an aft position in which it is shrouded in the upper surface of said single flight sustaining aerodynamic surface into a forward position in which it overlies the fuselage and projects laterally therefrom, means including a pair of links pivoted to said fuselage between said positions and pivoted to said second aerodynamic surface for moving said second aerodynamic surface bodily between said positions, and pilot operative means for swinging said links to move said second aerodynamic surface between said positions.

7. An aircraft as defined in claim 1 including a nose landing gear pivoted to the projecting portion of said fuselage and movable about its pivot from a retracted position within said fuselage and an extended ground engageable position, and actuating means for extending and retracting said gear, said second aerodynamic surface carried by said gear and movable into lift producing position with said gear as the latter is extended.

8. An aircraft as defined in claim 1 including a nose landing gear pivoted to the projecting portion of said fuselage and movable about its pivot from a retracted position within said fuselage and an extended ground engageable position, and hydraulic means for extending and retracting said gear, said second aerodynamic surface carried by said gear and movable therewith between a retracted position in which it is housed within said fuselage and an extended lift producing position.

9. An aircraft as defined in claim 1 including a nose landing gear pivoted to the projecting portion of said fuselage and movable about its pivot from a retracted position within said fuselage and an extended ground engageable position, hydraulic means for extending and retracting said gear, said second aerodynamic surface carried by said gear and movable therewith between a retracted position in which it is housed within said fuselage and an extended lift producing position, and hydraulic means for folding said surface prior to completion of the retraction of said gear.

10. An aircraft as defined in claim 1 including a nose landing gear pivoted to said fuselage, hydraulic actuating means for moving said gear about its pivot between an extended position and a retracted position in which it is housed within said fuselage, said second aerodynamic surface carried by said gear and movable thereby between an extended lift producing position and a retracted position within said fuselage, said surface having an inboard panel which is pivoted to said gear for folding movement about a spanwise axis of said inboard panel and two oppositely extended outboard panels each pivoted to a lateral extremity of said inboard panel for folding movement about a fore and aft axis, and hydraulic actuated means for folding and unfolding said outboard panels as said gear is retracted and extended.

References Cited in the file of this patent

UNITED STATES PATENTS

| | | |
|---|---|---|
| 1,496,200 | Baumann et al. | June 3, 1924 |
| 1,606,117 | Caples | Nov. 9, 1926 |
| 1,772,815 | Mandrick | Aug. 12, 1930 |
| 1,948,629 | Pitts | Feb. 27, 1934 |
| 2,074,897 | Everts | Mar. 23, 1937 |
| 2,148,962 | Potoczek | Feb. 28, 1939 |
| 2,342,184 | Fawcett | Feb. 22, 1944 |
| 2,354,116 | Hazek | July 18, 1944 |
| 2,410,239 | Roe | Oct. 29, 1946 |
| 2,428,194 | Bockrath | Sept. 30, 1947 |
| 2,511,362 | Mercier | June 13, 1950 |
| 2,511,502 | Gluhareff | June 13, 1950 |
| 2,516,346 | Saulnier | July 25, 1950 |
| 2,525,844 | Weaver | Oct. 17, 1950 |
| 2,601,962 | Douglas | July 1, 1952 |
| 2,743,888 | Lippisch | May 1, 1956 |

FOREIGN PATENTS

| | | |
|---|---|---|
| 238,542 | Germany | Sept. 29, 1911 |
| 1,083,557 | France | June 30, 1954 |